Figure 1:
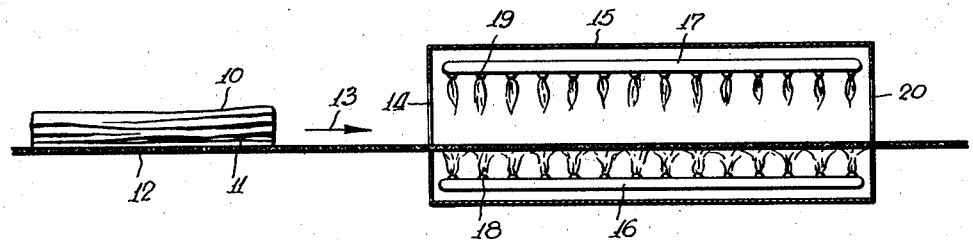

April 23, 1940.   S. MUSHER   2,198,209

TREATMENT OF FATTY MEATS AND FISH AND OTHER FOODS

Filed Jan. 25, 1940

INVENTOR
*Sidney Musher*
BY
ATTORNEY

Patented Apr. 23, 1940

2,198,209

UNITED STATES PATENT OFFICE 2,198,209

TREATMENT OF FATTY MEATS AND FISH AND OTHER FOODS

Sidney Musher, New York, N. Y., assignor to Musher Foundation Incorporated, New York, N. Y., a corporation of New York Application January 25, 1940, Serial No. 315,487

11 Claims. (Cl. 99—150)

This invention relates to the preservation of fatty meat and fish products against the development of rancidity during normal periods of distribution or storage.

In accordance with this invention, the fatty meat or fish is surfaced with a sugar and a phosphatide, and during or subsequent to the application of the sugar and phosphatide, the fatty fish or meat is subjected to an elevated temperature of over about 200° F. and preferably over 220° F. whereby a reaction occurs to improve materially the keeping of the fatty meat or fish and help preserve such product against rancidity.

Among the fatty meat and fish that may be treated in accordance with this invention are included particularly those products which contain on their dry weight basis in excess of about 20% total glyceride oil or fat content. Generally the higher the fat content, the more noticeable is the stabilizing effect.

Among the fatty meat products which may be treated are included bacon sides and bellies, hog fat back, belly fat and ribs of pork, whether pickled, salted or smoked, salt pork, loin trimmings of beef, corned beef, tongue, roast beef, loins of lamb, chuck and flank of mutton and poultry including particularly fatty ducks, geese, chickens and turkeys.

Among the fatty fish are included particularly herring, salmon, sardines, tuna fish, mackerel, white fish and menhaden.

These fatty meat and fish may be treated in their substantially raw and uncooked condition or they may first have been salted, smoked or cooked or, following treatment, they may be subjected to salting, smoking, cooking and/or freezing.

As the sugar ingredient preferably a monosaccharide sugar is used, such as dextrose, glucose, invert sugar, or fructose. Other sugars which may less preferably be employed include the di-saccharide or poly-saccharide sugars, such as sucrose, lactose, fructose, maltose, mannose or arabinose.

The raw sugars such as raw cane sugar, raw beet sugar and the residues of mother liquors obtained from the refining of such sugars may very desirably be used even in preference to the refined sugars. The residues of cane and beet sugars, for example, raw or refinery blackstrap molasses and sorghum molasses may also be used.

The preferred phosphatide component is lecithin which may be extracted from soya, cottonseed and corn and is generally removed from the oils of these materials. The lecithin may be used either in substantially crude or in refined condition. Cephalin and hog brains may also be used in lieu of or in addition to lecithin.

The sugar such as dextrose and the phosphatide such as lecithin are preferably combined in equal proportions although other proportions may be used dependent upon the degree of protective action that is desired and the type of material being treated. For practical purposes, mixtures of between 1 and 10 parts of sugar to 1 part phosphatide have shown very good results. Other combinations may be employed such as, for example, from 5% to 95% of sugar and from 95% to 5% of phosphatide.

One desirable procedure that may be followed is to prepare a boiling solution comprising from about 5% to about 40% and preferably about 10% of a mixture of equal parts of dextrose and lecithin, dipping the fatty fish or meat such as a bacon belly, either in whole or in sliced form, into the boiling solution for a period of from several seconds to about a minute or more whereby a reaction occurs at the surface of the bacon substantially to stabilize the bacon against oxidative deterioration.

There may be applied during this process from 0.05% to about 3% by weight of the combination of the sugar and phosphatide against the weight of the fatty fish or meat being treated but even though only a very small amount is applied, the surface reaction is sufficient substantially to stabilize the product against rancidity.

Neither sugar alone nor lecithin alone will give the desired results of the present invention and it is necessary for the combination to be employed in order to obtain the full degree of stabilization.

A bacon slab was divided into 3 portions and treated as follows:

A. One portion was dipped for 40 seconds into boiling water at a temperature of about 212° F.

B. One portion was dipped for 40 seconds into a boiling water solution containing 15% of dextrose at a temperature of about 215° F.

C. One portion was dipped for 40 seconds into a boiling water solution containing 7½% lecithin and 7½% of dextrose at a temperature of about 215° F.

Following the treatment, each portion was extracted with a fat solvent and the fat, freed of solvent, was tested on a stability apparatus by means of which air was bubbled through a 20 cc. sample at 208° F. until rancidity was observed, with the following results:

| | Rancid after— |
|---|---|
| Fat from bacon A | 4 hours |
| Fat from bacon B | 4½ hours |
| Fat from bacon C | 14 hours |

The fatty meat or fish, after treatment by dipping as above, may be dried to remove excess moisture and the higher the drying temperature, the greater the stabilizing effect.

In the case of the meat products particularly, draining and drying are desirable after the dipping into the boiling sugar-lecithin solution.

It is particularly desirable for the surface of the fatty meat or fish after application of the sugar and phosphatide to the surface thereof to be exposed to a temperature between 300° F. and 400° F. whereby still more marked stabilization against rancidity is obtained.

It is not known exactly what reaction takes place between the sugar and lecithin and the fatty meat or fish at the elevated temperature but apparently some reaction does occur whereby the stabilization is obtained.

In order to reach the surface temperatures of about 300° F. to 400° F., the surfaces of the fatty fish or meat may be subjected to a direct flame treatment as when passed on a moving conveyor through an oven and subjected to direct flame treatment for a period of from several seconds to about a minute or more after application of the sugar and lecithin combination to the fatty fish or meat surface.

Where the fatty fish or meat is not dipped into a boiling solution of the sugar and phosphatide, other methods of application of the sugar and phosphatide may be made. For example, a powdery mixture of dextrose and lecithin may be prepared by merely thoroughly mixing together about 60% to 85% by weight of powdered anhydrous dextrose and from 40% to 15% of lecithin which powdered mixture will more readily go into solution when added to water for heating and which powdery mixture may also be rubbed or dusted over the surface of the fatty meat or fish.

In order to produce a more readily dispersable powder of sugar and lecithin, which may even be suitable for dusting, the combination of sugar and lecithin may be admixed with dispersing agents such as with lime, powdered skim milk, or starch.

For example, a combination of equal parts of dextrose and lecithin may be prepared and the combination of dextrose and lecithin mixed with equal parts or more of a dispersing agent such as starch. The resultant product may readily be used for dusting over the oxidizable meat and fishery products in accordance with this invention to be followed by the high heat treatment to produce the preservative effect.

Another method that may be followed is for the sugar to be dissolved in water or for molasses to be mixed with water and for the lecithin then to be dispersed therethrough by passing the combination of the lecithin, sugar and water through a colloid mill or homogenizer whereby the lecithin particles are substantially dispersed throughout the aqueous medium. The fatty meat or fish may then be dipped into said solution at a boiling temperature or otherwise surface as above and subsequently subjected to direct flame or high heat treatment.

In addition to treatment with direct flame, the surfaces of the fatty meat or fish may be subjected to a treatment with superheated steam following the addition of the sugar and lecithin thereto and at a temperature between about 300° F. and 400° F.

Even where the sugar and lecithin are acually burnt on the surface of the fatty meat or fish, the desired stabilization is obtained.

It is not necessary for the heat to penetrate beneath the surface of the fatty meat or fish as the reaction occurring at the surface is all that is required.

Where desired, after the application of the sugar and lecithin and heat to the surface of the fatty meat or fish, which may take on a shiny appearance after the heat application, they may, where desired, be washed in order to remove any burnt particles which remain sticking to their surfaces.

Where molasses or malt syrup is used, instead of the dextrose, the molasses or syrup may be rubbed on the surface of the fatty meat or fish, such as the bacon, or the bacon may be dipped into the molasses, or the molasses or syrup may be diluted and then used for application to the bacon.

After treatment with the sugar and lecithin, the fatty meat or fish may be frozen, brined, smoked or otherwise treated without reducing the protective effect of the sugar and lecithin reaction.

For example, whole round mackerel or mackerel fillets after cleaning may be immersed in a boiling solution containing 5% dextrose, 5% lecithin and 5% or more of salt for a period of from about 1 to 15 seconds and the mackerel may then, with or without subsequent immersion in brine, be frozen and the mackerel will remain free of rancidity for long periods of time.

Where desired, the fatty meat or fish may be immersed in the boiling dextrose-lecithin solution before or after cooking and the cooked product may thereupon be frozen.

Cooked mackerel is not readily frozen and held in frozen condition for periods of time during normal storage and distribution due to its rapid development of rancidity. Where the mackerel is immersed in the boiling dextrose-lecithin solution before being frozen, however, rancidity is retarded to a considerable degree.

In the treatment of fatty fish, the immersion is desirably for a period of less than about 20 seconds and preferably for between about 1 second and 10 seconds. In the case of fatty meats, such as bacon, the immersion may take place for longer periods such as for 30 seconds to 1 minute or more.

In addition to the use of lecithin in combination with sugar such as dextrose, there may also be employed combinations of sugar with phosphoric acid and the acid phosphates, although these latter products are much less desirably employed than lecithin itself for combination with sugar.

In addition to treating the fatty meat or fish in whole form, such as when whole poultry or whole slab bacon is treated, the fatty meat or fish may also be sub-divided into small pieces or even sliced and the surface of the slice is treated in a similar manner either by dipping into a boiling solution of the dextrous-lecithin solution or by dusting the dextrose-lecithin powdered mixture thereon and then applying a direct heat in excess of about 250° F. and preferably as high as 300° F. to 400° F.

There may also be employed for combination with sugar, preferably with the lecithin, for surfacing the fatty meat or fish prior to the elevated temperature treatment, aliphatic polycarboxylic acids, such as tartaric acid, citric acid, malic acid and succinic acid, and tyrosine and its esters.

Fatty meats and fish may also be immersed in a solution of gelatin and subsequently frozen after removal from the gelatin solution while carrying a gelatin surfacing. A hard continuous film of gelatin which has been "set" on the surface of the meat or fish will form tending to prevent air from reaching the surface whereby desiccation particularly will be retarded.

Walnuts, almonds, pecans, peanuts, soya beans, and even such materials as wheat germ, sesame seeds, cheeses and olives may also be stabilized by being immersed in a boiling dextrose-lecithin solution or treated with a powdered dextrose-lecithin mixture and then subjected to a flash heat substantially in excess of about 250° F.

For example, almonds may be immersed in a boiling solution containing 8% of dextrose and 8% of lecithin for a period of about 30 seconds and the excess moisture then removed by subjecting to vacuum drying or hot air blowing.

Green or ripe olives in salted or dried condition may similarly be immersed in a dextrose-lecithin solution at a temperature of about 212° F. or more and then packed with or without additional heat treatment.

Where the fruits or vegetables in cooked or uncooked condition are immersed in a boiling sugar-phosphatide or dextrose-lecithin solution for a relatively short period, or where some of the dextrose-lecithin is present in the solution in which the fruit or vegetable is cooked, the product will be much more resistant to deterioration.

In the treatment of crackers and biscuits, they may be surfaced with a sugar-lecithin combination as, for example, by dusting and then subjected to a temperature of over about 225° F. to 250° F. to obtain desired beneficial stabilization.

Although the preferred procedure involves dipping the fatty meat or fish into a boiling solution of sugar and lecithin, followed by removal of the fatty meat or fish to form a substantially dry surfacing on the fatty meat or fish of the sugar and lecithin which sugar and lecithin may be reacted with the surface of the meat and fish, it is also possible in connection with certain types of food products and particularly with low fat food products, to permit them to remain in the solution of the sugar and lecithin for a relatively long period, which solution if desired may have a substantially higher concentration of sugar and which solution may be heated and then subsequently permitted to cool and remain cold during a prolonged storage period.

For example, whole strawberries which are substantially devoid of fat, may be immersed in a boiling solution containing from 10% to 50% of sugar such as dextrose and from 1% to 10% of lecithin and the strawberries may be permitted to remain in the liquid with or without additional concentration of the liquor by evaporation of the water.

The same may be done with sliced or whole peaches, apricots, oranges or grapefruit.

Figure 2:
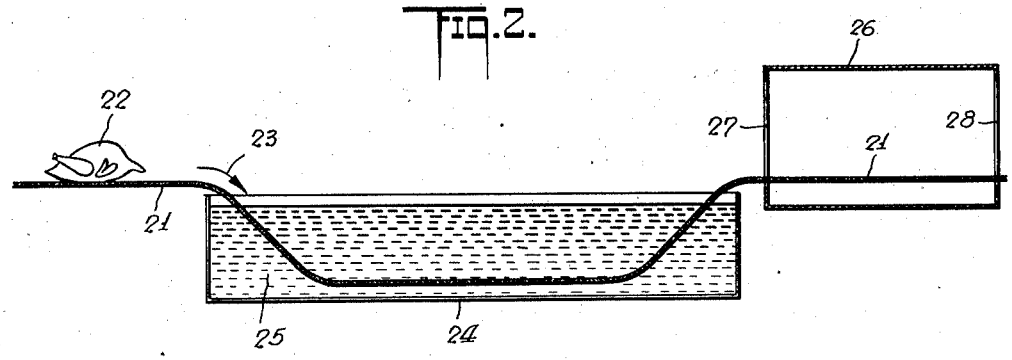

In the drawing is illustrated diagrammatically two methods of carrying out the preferred procedures according to the present invention, both Fig. 1 and Fig. 2 being side diagrammatic elevation views partially in section illustrating the application of the stabilization material and the manner of causing a permanent combination between the stabilizing material and the meat or fish being stabilized.

In Fig. 1 the piece of bacon 10 preferably with the skin side down is placed upon the mesh carrier belt. Both sides of the piece of bacon 10 preferably are treated with a mixture of equal parts of lecithin and dextrose, the amount of the mixture of lecithin and dextrose, for example, varying from about 0.05% to 5% of the total weight of the bacon slab.

The belt then moves in the direction indicated by the arrow 13 through the opening 14 into the chamber 15 where the lower burners and the upper burners 17 through a series of flames 18 and 19 raise the temperature of the faces of the bacon at the surface to about between 300° F. to 450° F., the total heat treatment taking about 15 seconds. The bacon then after having been treated passes out through the opening 20 and after cooling is removed from the belt. The heat treatment is insufficient in duration to cause any substantial cooking or melting of the meat or fat on the surface of the bacon.

In Fig. 2 a carrier belt is indicated diagrammatically 21 and it may contain a dressed chicken 22, the belt 21 having suitable devices (not shown) to hold the chicken in position thereon. The belt then moves in the direction 23 down into the trough or container 24 containing a boiling or hot solution containing 10% of powdered anhydrous dextrose and 10% lecithin. The preferred temperature of the bath may be 215° F. dependent upon the material treated. The time of treatment in the bath may vary from about 2 seconds for fish to about 60 seconds for bacon or chickens, which should be insufficient to cause any cooking or change in the meat or fish product during treatment. In all cases, the meat product should be entirely immersed in the hot or boiling suspension.

The product after treatment in the hot or boiling solution then passes into the drying chamber 26 through the opening 27 where it is then subjected to sufficient treatment with hot air to dry it and permit the mixture of lecithin and sugar to solidify upon the surface of the meat product. After drying, the meat product passes out through the opening 28 still carried on the belt 21.

It is usually not desired to cause any substantial change in the body of the food except on the surface thereof during the treatment of the food with the sugar phosphatide combination. If desired, however, cooking, frying, drying, etc., may precede or follow the treatment.

By the expression "meat" as used in the application and in the appended claims, there are included both meat and fish.

This application is a continuation in part of applications, Serial No. 260,898, filed March 10, 1939, Serial No. 269,913, filed April 25, 1939, and Serial No. 292,613, filed August 30, 1939.

Having described my invention, what I claim is:

1. A process of stabilizing a meat subject to oxidative deterioration which comprises treating the surface of the meat before packaging with a mixture of a sugar and also a phosphorous compound selected from the group consisting of the phosphatides and phosphoric acid, and then heating to at least 200° F. whereby said meat is substantially stabilized against oxidative deterioration.

2. A process of stabilizing meat subject to oxidative deterioration which comprises immersing the meat before packaging into a boiling solution, having a temperature of at least 200° F., of a mixture of added sugar and added phosphatide for a relatively short period, whereby a reaction between the sugar, phosphatide and the surface of the meat takes place to stabilize said meat against oxidative deterioration.

3. A process of stabilizing meat subject to oxidative deterioration which comprises surfacing the meat before packaging with a sugar and also a phosphatide, and then subjecting the surface of the meat to a flash heat in excess of about 300° F., whereby said meat is substantially stabilized against oxidative deterioration.

4. A process of stabilizing bacon which comprises immersing the bacon in a boiling solution, having a temperature of at least 200° F., containing a mixture of about equal parts of a sugar and lecithin, whereby a reaction between the sugar, lecithin and the surface of the bacon takes place to stabilize said bacon against rancidity.

5. A process of stabilizing fatty fish which comprises immersing the fish in a boiling solution, having a temperature of at least 200° F., containing added sugar and added lecithin for a short period of time, whereby a reaction between the sugar, lecithin and the surface of the fish takes place to stabilize said fatty fish against oxidative deterioration.

6. A process of stabilizing foods against oxidative deterioration which comprises treating the surface of said foods with a mixture of a sugar and also a phosphorous compound selected from the group consisting of the phosphatides and phosphoric acid, and then heating to at least 200° F. whereby said food is substantially stabilized against oxidative deterioration.

7. A process of stabilizing fatty foods against oxidative deterioration and rancidity which comprises treating the surface of said foods with a mixture of added sugar and added lecithin, and then heating to at least 200° F., whereby said food is substantially stabilized against oxidative deterioration.

8. A process of stabilizing fruits against oxidative deterioration which comprises treating the surface of said fruits with added sugar and added phosphatide, and then heating to at least 200° F. to cause a reaction between the sugar, phosphatide and the surface of the fruit, whereby said fruit is substantially stabilized against oxidative deterioration.

9. A food product, stabilized against oxidative deterioration, the surface of which contains the heat reaction product of an added sugar and an added phosphorous compound selected from the group consisting of the phosphatides and phosphoric acid with the surface of the food, the temperature of the heat reaction being at least 200° F.

10. Fatty meats, stabilized against oxidative deterioration, the surface of which contains the heat reaction product of an added sugar and an added phosphatide with the surface of the fatty meats, the temperature of the heat reaction being at least 200° F.

11. Fatty meats, stabilized against oxidative deterioration, the surface of which contains the heat reaction product of an added sugar and added lecithin with the surface of the fatty meats, the temperature of the heat reaction being at least 200° F.

SIDNEY MUSHER.